United States Patent [19]

Okamura et al.

[11] Patent Number: 5,604,426

[45] Date of Patent: Feb. 18, 1997

[54] ELECTRIC APPARATUS WITH A POWER SUPPLY INCLUDING AN ELECTRIC DOUBLE LAYER CAPACITOR

[75] Inventors: Michio Okamura; Takeshi Morimoto; Kazuya Hiratsuka, all of Yokohama, Japan

[73] Assignees: Asahi Glass Company Ltd., Tokyo; Okamura Laboratory Inc., Yokohama; Elna Company Ltd., Fujisawa, all of Japan

[21] Appl. No.: 266,460

[22] Filed: Jun. 27, 1994

[30] Foreign Application Priority Data

Jun. 30, 1993 [JP] Japan .................. 5-187537
Jun. 30, 1993 [JP] Japan .................. 5-187538

[51] Int. Cl.$^6$ ........................ G05F 1/40
[52] U.S. Cl. ........................ 323/282; 320/1
[58] Field of Search .................. 323/282; 320/1

[56] References Cited

U.S. PATENT DOCUMENTS

| | | | |
|---|---|---|---|
| 4,821,166 | 4/1989 | Albach | 323/282 |
| 5,038,566 | 8/1991 | Hara | 320/2 |
| 5,214,313 | 5/1993 | Windes | 320/1 |
| 5,412,293 | 5/1995 | Minezawa et al. | 318/376 |
| 5,439,756 | 8/1995 | Anani et al. | 361/434 |
| 5,498,951 | 3/1996 | Okamura et al. | 320/1 |

FOREIGN PATENT DOCUMENTS

0564149A2  10/1993  European Pat. Off. .

5-161280  6/1993  Japan .

OTHER PUBLICATIONS

Electrical Engineering in Japan, vol. 116, No. 3, pp. 40–51, 1996, Michio Okamura, "A Basic Study On Power Storage Capacitor Systems"; Translated from Denki Gakkai Ronbunshi, vol. 115–B, No. 5, pp. 504–510, May 1995.

Denki Gakkai Ronbunshi, vol. 115–B, No. 5, 1995, pp. 504–510, Michio Okamura, "A Basic Study on Power Storage Capacitor Systems".

*Primary Examiner*—Stuart N. Hecker
*Attorney, Agent, or Firm*—Oblon, Spivak, McClelland, Maier & Neustadt, P.C.

[57] ABSTRACT

An electric apparatus with a power supply including a electric double layer capacitor capable of being charged in a short time and supplying a constant electric power with a high power efficiency, and in a peak load type electric apparatus such as an electric automobile, a long time small power output and a short time large power output can be derived as required. For a constant load type electric apparatus, electric power is supplied from an electric double layer capacitor of a power supply, and is stabilized to a constant voltage by a switching regulator, and for a peak load type electric apparatus, a power supply is made by connecting a first electric double layer capacitor of a high energy density type to a second electric double layer capacitor of a high power density type via a current output type switching regulator, and the second capacitor is charged with electric power in the first capacitor through the switching regulator. The output power is always derived from the second capacitor of high power density.

6 Claims, 7 Drawing Sheets

ELECTRIC APPARATUS WITH A POWER SUPPLY INCLUDING AN ELECTRIC DOUBLE LAYER CAPACITOR

BACKGROUND OF THE INVENTION

1. Field of the Invention

The present invention relates to an electric apparatus provided with a power supply. Particularly, the present invention relates to an electric apparatus with a power supply including an electric double layer capacitor.

2. Discussion of Background

When electric apparatuses are classified from the consumption pattern of electric power, there are constant load type electric apparatuses which consume continuously a relatively constant electric power and peak load type electric apparatuses which consume intermittently a relatively large electric power. The constant load type electric apparatuses include electric devices such as desk lamps, flashlights, personal computers, wordprocessors, portable telephones and cordless telephones, which consume electric power at a relatively constant rate during use.

On the other hand, the peak load type electric apparatuses are electric devices such as electric screw drivers, electric drills, electric spot welding machines, electric cars and electric scooters which require a large electric power for a short time. These apparatuses consume intermittently a relatively large electric power during use, in other words, they consume a high peak power of a short duration repeatedly with certain time intervals.

In either type of the electric apparatuses, power sources, such as commercial a.c. power lines, batteries, solar cells or the like are used. In some cases, generators specially designed for the purpose are used.

When the electric power is to be obtained from commercial a.c. power lines, it is inconvenient because one cannot be freed from the cable.

On the other hand, when a battery is used as a power source, the apparatus can be carried around without a cable. In particular, a secondary battery is advantageous for it can store the energy and does not require any sunlight as in the case of a solar cell.

However, the secondary battery has a serious problem that it takes long time for charging, and it is common that the time required for charging is longer than the time of use. Further, from the nature of the secondary batteries, it is difficult to utilize the full capacity, i.e. charging and discharging to 100% of the capacity is almost impossible.

The secondary battery has a further restriction that the service life (cycle life) will shortly be expired by repeated charge and discharge. There is a tendency of reducing the service life as the charging time is shortened by increasing the charge current or as the energy density of a battery is increased.

Japanese Unexamined Patent Publication No. 161280/1993 discloses an auxiliary power supply for a vehicle provided with an electric double layer capacitor having a large capacitance in addition to a battery (a secondary battery). The auxiliary power supply is so adapted that an output power of regenerative braking from a retarder at the time of braking of the vehicle is stored in the capacitor through a rectifier, and the battery is charged with energy stored in the capacitor as required.

Although the electric double layer capacitor can effectively store electric power from the retarder even if the power is large and intermittent, there is a problem of charging deficiency when the battery is charged with electric power from the capacitor.

SUMMARY OF THE INVENTION

The first object of the present invention is to eliminate the above-mentioned disadvantage of the conventional technique and to provide a constant load type electric apparatus with a power supply which can deliver a constant electric power for a relatively long time and can quickly be charged.

The second object of the present invention is to provide a peak load type electric apparatus provided with a power supply capable of delivering a small electric power for a relatively long time and a large electric power for a short time as required.

Further, the third object of the present invention is to provide a peak load type electric apparatus with a power supply which allows effective use of the output electric power produced at the time of regenerative braking, especially, such as an electric car.

In order to achieve the first object of the present invention, there is provided a constant load type apparatus consuming continuously a relatively constant electric power, which comprises a power supply including an electric double layer capacitor and a switching regulator for transforming variant voltage electric power from the capacitor to a relatively constant voltage electric power.

For electric apparatuses such as vacuum cleaners, electric hair clippers and so on which are used continuously for a short time, it is preferable to use an electric double layer capacitor having a relatively small internal resistance or a combination of electric double layer capacitors connected in parallel to thereby reduce the equivalent internal resistance.

Further, in order to achieve the second object of the present invention, there is provided a peak load type electric apparatus consuming intermittently a relatively large electric power, which comprises a power supply including a first electric double layer capacitor of a high energy density type, a second electric double layer capacitor of a high power density type and a current output type switching regulator wherein the first capacitor is connected to the second capacitor by interposing the switching regulator so that the second capacitor is charged by the first capacitor via the switching regulator, whereby a long time small power output and a short time large power output can be derived as required.

The electric double layer capacitor of a high energy density type used in the present invention has a large capacity and an internal resistance of more than 50 $\Omega \cdot F$. The electric double layer capacitor of a high power density type has an internal resistance of less than 50 $\Omega \cdot F$.

Further, in order to achieve the third object of the present invention, there is provided a peak load type electric apparatus consuming intermittently a relatively large electric power during operation and being capable of efficient regenerative braking at the time of braking, which comprises a power supply including a first electric double layer capacitor of a high energy density type, a second electric double layer capacitor of a high power density type, a first switching regulator of a current output type between the first and the second capacitors which usually charges the second capacitor with electric power from the first capacitor and a second switching regulator of a current output type which returns an extra output power of regenerative braking of the electric apparatus via the second capacitor to the first capacitor, whereby a long time small output power and a short time large output power can be derived as required, and the extra output power of the regenerative braking supplied to the second capacitor is stored in the first capacitor of a large capacity via the second switching regulator.

In this case, a bi-directional switching regulator may be used instead of the first and the second switching regulators.

Further, a single switching regulator can be used instead of the first and the second switching regulators wherein in a normal operation, the input terminal of the switching regulator is connected to the first capacitor and the output terminal is connected to the second capacitor, and in a regenerative braking operation, the input terminal of the switching regulator is connected to the second capacitor and the output terminal is connected to the first capacitor by changing the connection.

In the expected applications, there should be enough time to switch between charge and discharge. Thus by replacing the input and the output connections, the single uni-directional switching regulator may be replaced for a bi-directional switching regulator.

In the foregoing description, many electric double layer capacitors are expressed as a single electric double layer capacitor. Although an electric double layer capacitor as explained may be a combination of plural electric double layer capacitors connected in series or/and in parallel.

Actually, rated working voltage and capacity of a single electric double layer capacitor may be insufficient, and it is a common way to connect plural electric double layer capacitors in series to obtain a large rated working voltage or/and in parallel to obtain a large capacity.

This condition is kept and applied throughout all the present inventions.

BRIEF DESCRIPTION OF THE DRAWINGS

A more complete appreciation of the invention and many of the attendant advantages thereof will be readily understood by reference to the following detailed description when considered in connection with the accompanying drawings, wherein.

DETAILED DESCRIPTION OF THE PREFERRED EMBODIMENTS

When an electric double layer capacitor is used for a power supply, the relation of the output voltage V to the store energy Q is expressed as follows:

$$Q=kV^2$$

The stored energy Q is in proportion to the square of the output voltage V. To obtain the output voltage, an equation of $V=\sqrt{(Q/k)}$ is derived from the above equation. Thus, the output voltage V of the electric double layer capacitor decreases in proportion to the square root of the residual energy Q unlike that of a secondary battery which essentially has a constant voltage characteristic. However, since a switching regulator can be operated as a DC—DC converter to yield a constant voltage output, the regulator can supply a constant voltage output to a load (a constant load type electric apparatus). Further, since the internal resistance of the electric double layer capacitor is smaller than that of the secondary battery, and it is unnecessary to wait for the pertinent chemical reaction, the charging of the capacitor can be performed in an extremely short time in comparison with the secondary battery.

On the other hand, when a first electric double layer capacitor of a high energy density type and a second electric double layer capacitor of a high power density type are combined, it is possible to derived a large power output for a short time and a small power output for a long time as required.

Further, since a current output type switching regulator is interposed between the first capacitor and the second capacitor, the charging efficiency for the second capacitor to be charged with electric power of the first capacitor can be increased. For instance, when design is so made that the switching regulator is operable down to a level of ¼ of the maximum charging voltage, an amount of up to 94% of electric power charged in the electric double layer capacitor can be utilized.

On the other hand, when an output power of regenerative braking is obtainable, an extra amount of the electric power can be stored in the first capacitor having a large capacitance via the second switching regulator, and accordingly, more effective utilization of energy is obtainable.

Figure 1:
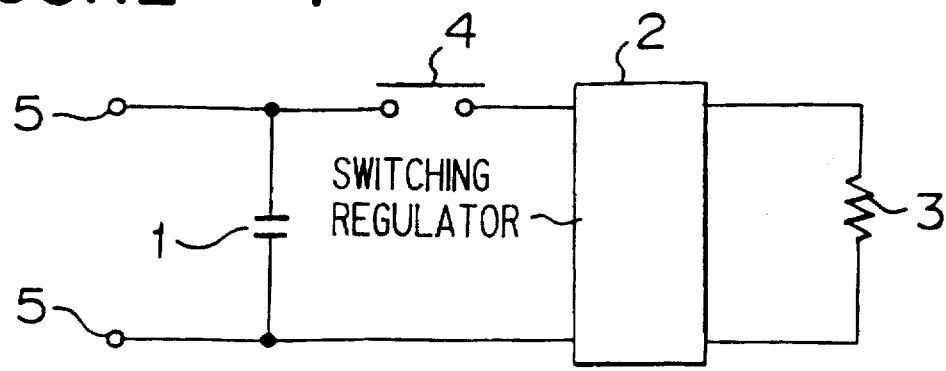
FIG. 1 is a model circuit diagram showing an embodiment of a constant load type electric apparatus to which the present invention is applied.

In the following, an embodiment of the power supply used for a constant load type electric apparatus according to the present invention will be described exemplifying a circuit for a flashlight, with reference to FIG. 1.

The flashlight has an electric double layer capacitor 1 in a power supply which is connected with a lamp 3 as a load by interposing a switching regulator 2. In this embodiment, a power supply switch 4 is disposed between the electric double layer capacitor 1 and the switching regulator 2. Numerals 5, 5 designate charging terminals used when the electric double layer capacitor 1 is charged.

The electric double layer capacitor 1 is preferably of an energy storage type having a large capacitance such as a capacity per volume of 10 Wh/l–100 Wh/l, in particular, 25 Wh/l or higher.

Figure 2:
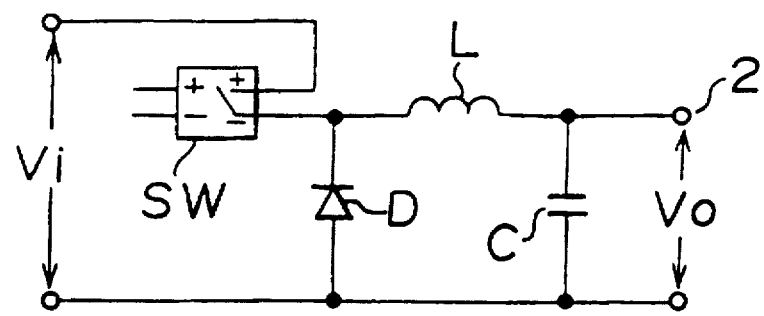
FIGS. 2(A), 2(B) and 2(C) are circuit diagrams showing various types of switching regulator which are usable as a power supply for the electric apparatus of the present invention.
Figure 2:
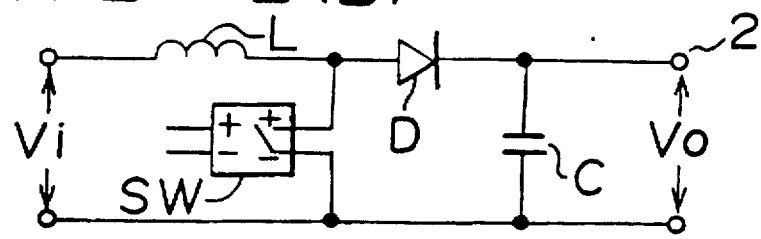
Figure 2:
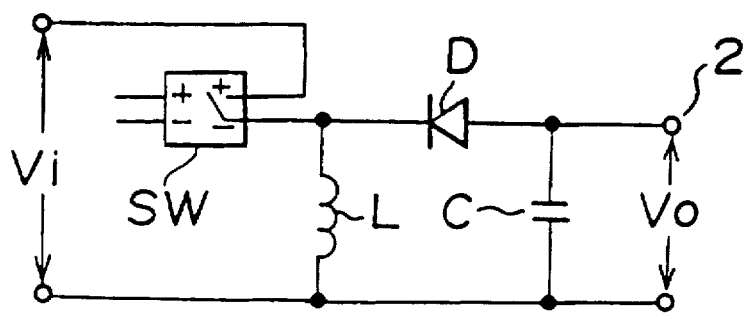

As the switching regulator 2, so called chopper type devices as shown in FIG. 2A, 2B and 2C can preferably be used.

FIG. 2A shows a voltage step-down type switching regulator, wherein a switching element SW is turned on and off by means of a pulse width control circuit (not shown), by which the following output voltage is obtainable;

$$V_o = T_{on} \times V_i / (T_{on} + T_{off})$$

where $T_{on}$ is an ON time, $T_{off}$ is an OFF time, $V_i$ is an input voltage from the electric double layer capacitor 1 and $V_o$ is an output voltage. In FIG. 2A, a symbol D designates a flywheel diode which will discharge the energy in a choke coil L (the energy being stored when the switching element SW is in an ON state) when the switching element SW is in an OFF state.

FIG. 2B shows a voltage step-up type switching regulator. In this case, an output voltage $V_o$ which is higher than an input voltage $V_i$ can be obtained as expressed by following equation:

$$V_o = \{(T_{on} \times V_i)^2 / 2I_o \times L(T_{on} + T_{off})\} + V_i$$

wherein $I_o$ is an output current and L is the inductance of a choke coil.

FIG. 2C shows a polarity changing type switching regulator which generates a negative output voltage $V_o$ having an opposite polarity of the input voltage $V_i$. In this case, the output voltage $V_o$ is expressed by:

$$V_o = -(T_{on} \times V_i)^2 / 2I_o \times L(T_{on} + T_{off})$$

Besides the above-mentioned switching regulators, it is possible to use a switching regulator such as one with a transformer, generally called as a flyback converter, a forward converter and a bridge converter.

In the next, the operation (for instance, the operation can be traced with use of a simulation program "SPICE") of the flashlight according to the embodiment shown in FIG. 1 will be described with reference to graphs of FIGS. 3 and 4 which show a result of analysis of each part of the flashlight in operation.

As the power supply, an electric double layer capacitor 1 of a rated voltage of 10 V and a capacitance of 200 F (an internal resistance of 0.1 Ω) was used, and a lamp 3 of 10 Ω (a rated voltage of 5 V, a rated current of 500 mA and an electric power of 2.5 W) was connected as a load to the capacitor 1 by interposing a voltage step-down switching regulator 2 (described with reference to FIG. 2A).

Figure 3:
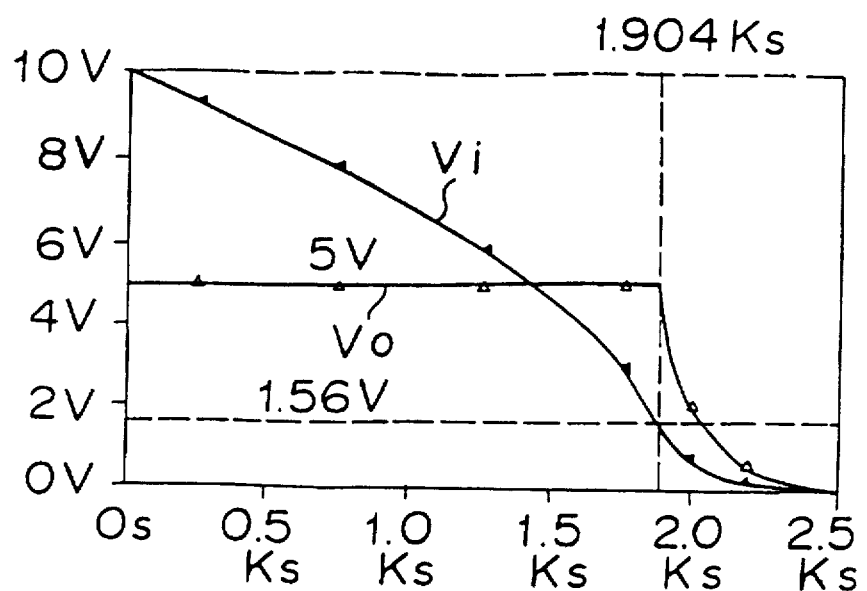
FIG. 3 is a graph showing an input voltage and an output voltage of the switching regulator in the embodiment shown in FIG. 1.

FIG. 3 is a graph showing a change with time of an input voltage $V_i$ applied from the electric double layer capacitor 1 to the switching regulator 2 and a change with time of an output voltage $V_o$ of the switching regulator 2.

In the switching regulator shown in FIG. 2A, the input voltage $V_i$ of the switching regulator 2, namely, a voltage across the terminals of the electric double layer capacitor 1 decreases in proportion to the square root of the residual energy. However, the output voltage $V_o$ of the switching regulator 2 is maintained to about 5 V until the input voltage $V_i$ is reduced to 1.56 V by feed back control.

Figure 4:
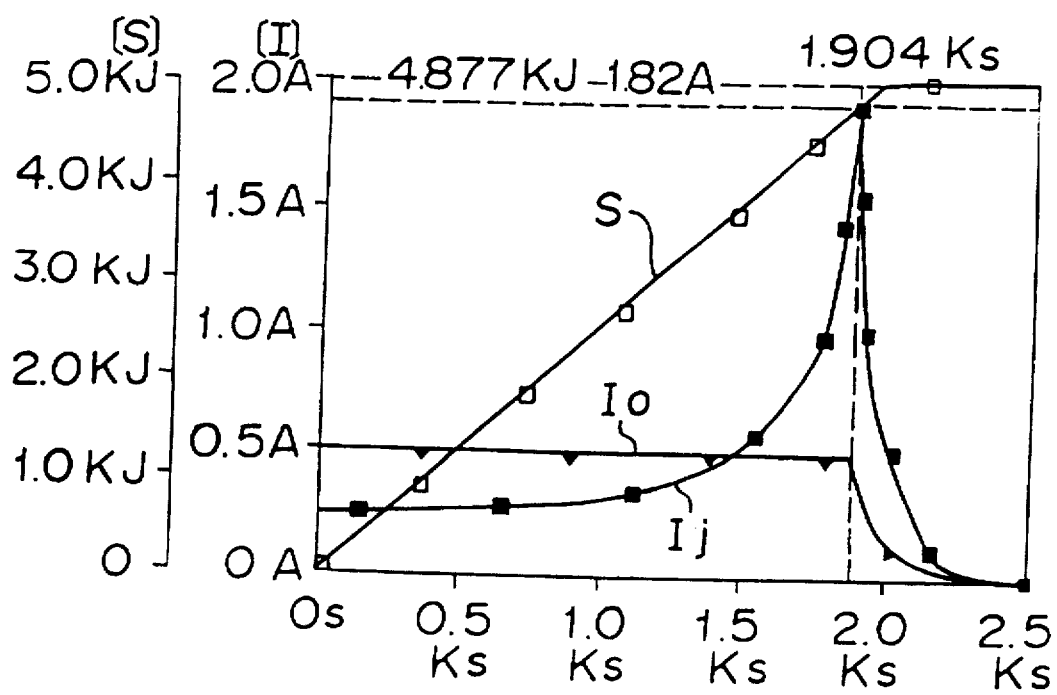
FIG. 4 is a graph showing an input current and an output current of the switching regulator and electric energy in an electric double layer capacitor in the embodiment shown in FIG. 1.

FIG. 4 is a graph showing each change with time of an amount of consumed electric power S, a discharging current $I_i$ and a load current $I_o$. Namely, a symbol $I_i$ indicates the discharging current of the electric double layer capacitor 1 and a symbol $I_o$ indicates a load current flowing into the electric lamp 3. The discharging current $I_i$ indicates a curve shown in FIG. 4 because the load electric power is constant while the terminal voltage is decreased, and it shows a rapid rise at the final stage of discharging. In the graph of FIG. 4, the right side Y-axis indicates a current (I) level axis having a scale of ampere (A) and the left side Y-axis indicates an amount of consumed electric power (S) having a scale of Joule as unit. Further the time axis is scaled with kilo seconds (Ks).

In this embodiment, the electric discharge of the electric double layer capacitor 1 was continued until the input voltage and the discharge current reached a level of 1.56 V and a level of 1.82 A respectively. The utilization of electric power of the electric double layer capacitor during the operation is read from the trace of the consumed electric power S ($=V_i \times I_i$) in FIG. 4. The trace indicates an integrated value of electric power i.e., an electric energy. Accordingly, when a cursor is set to 1904 seconds, at which the terminal voltage of the electric double layer capacitor 1 has reached 1.56 V, to observe the left side Y-axis indicating a unit of Joule heat in the graph of FIG. 4, read out value is 4877 Joules. Therefore, it is understood that the utilization rate of electric power reaches 97.55% of the charged energy.

The above-mentioned explanation is on the assumption of using an ideal switching regulator 2 which is efficiently operable in a range between the maximum input of 10 V and 0.29 A and the minimum input of 1.56 V and 1.82 A. For instance, even when a switch for power supply 4 is turned off to stop the electric discharge at the time of around 1820 seconds at which the discharge current $I_i$ becomes 1 A (when, the input voltage $V_i$ is 2.65 V), energy to be utilized is 4648 Joules. In this case, the utilization efficiency of the electric power obtained is 93%. In practical use, a range of 94%–85% is preferable.

In the above-mentioned embodiment, use of the flashlight is exemplified. However, the present invention is applicable to electric apparatuses consuming a small electric power for a long time (more than 1–2 hours), such as personal computers, wordprocessors, cordless telephones, cordless facsimiles, portable radios, TVs, tape recorders, CD players, watches and so on.

The present invention is also applicable to electric apparatuses such as medical equipment directly connected to human bodies, such as submergible motor pumps, electric toothbrushes, bubble baths, electro-cardiographs, monitors for medical care and so on, since it is possible to easily attain the complete insulation to prevent an electric shock in comparison with a case of using a commercial power line as the power source.

Further, the present invention can be applied to electric apparatuses such as vacuum cleaners, lawn mowers electric hedge trimmers, electric hair clippers, wherein power for a load during use is constant, however, the load is used continuously for a short time, e.g. within 1 hr. In this case, an electric double layer capacitor having a relatively low internal resistance or a plurality of electric double layer capacitors connected in parallel may be used so as to reduce the equivalent internal resistance.

In the present invention, when a rapid electric charging is required, the electric apparatus can be charged in a short time such as about 15 minutes so that a fully charged state (a state of charging to a rated voltage) is obtainable. Alternatively, the electric apparatus can be charged within 1–2 hrs with electric power at night in order to reduce an electric power rate. Thus, the electric apparatus of the present invention can be used depending on circumstances. The electric apparatus of the present invention can also be used as a auxiliary power source for an air conditioner which is used in the daytime when the electric power demand is excessive.

Figure 5:
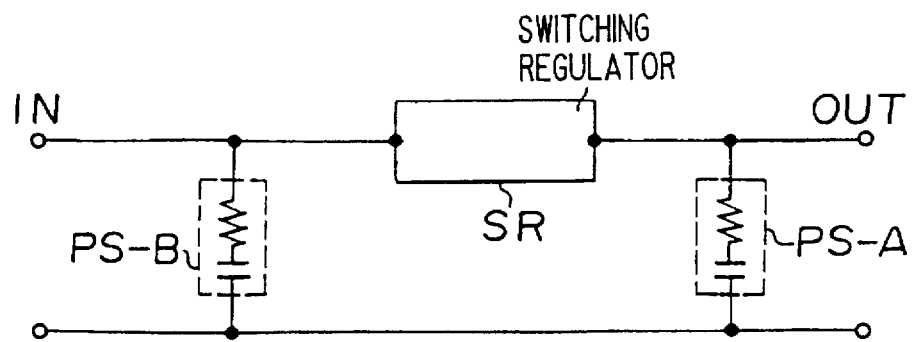
FIG. 5 is a circuit diagram showing an embodiment of the power supply used for a peak load type electric apparatus according to the present invention.

In the following, an embodiment of a peak load type electric apparatus with a power supply will be described with reference to FIG. 5. The power supply comprises a first electric double layer capacitor PS-B of a high energy density type having a large capacity and a high internal resistance and a second electric double layer capacitor PS-A of a high power density type having a relatively small capacity and a low internal resistance. A constant current output type switching regulator SR are connected between the first and the second capacitors so as to charge the second capacitor PS-A with power of the first capacitor PS-B. In FIG. 5, a symbol IN designates a charging terminal and a symbol OUT designates an output terminal connected to a load (not shown).

The switching regulator SR is so operated as to charge the second capacitor PS-A with electric power from the first capacitor PS-B with its constant current output function and to keep the second capacitor PS-A at a set voltage.

Figure 6:
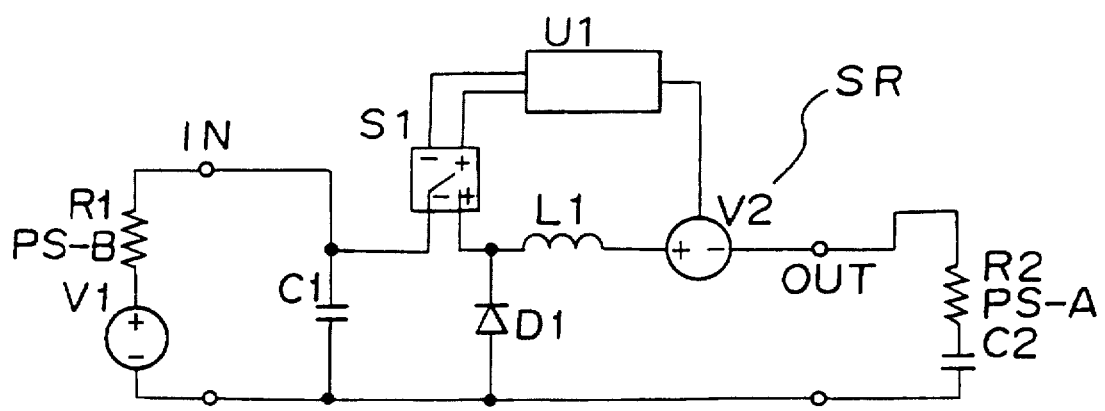
FIG. 6 is a circuit diagram showing the circuit structure of the switching regulator installed in the power supply shown in FIG. 5.

An example of the construction of the switching regulator SR is shown in FIG. 6. It is sufficient that the current capacity of the switching regulator SR is as small as ⅓–1/10 in comparison with a current fed to a load.

The switching regulator SR shown in FIG. 6 is in principle the same as the voltage step-down switching regulator shown in FIG. 2A wherein a diode D1 is called a flywheel diode which forms electric circuit for discharging an electric energy accumulated in a choke coil L1 when a switching element S1 is turned off.

In this embodiment, symbols V1 and R1 shown at the left side in FIG. 6 correspond to the first capacitor PS-B, and symbols C2 and R2 at the right side in FIG. 6 correspond to the second capacitor PS-A to be connected to a load. The symbol C1 designates a capacitor having a low internal resistance and a capacity of about 0.2–2 μF which prevents a transient current from flowing into the first capacitor PS-B each time when the switching element S1 is turned on and off.

The operation of the switching regulator SR will be described. An output current (a charging current supplied to the second capacitor PS-A) is detected by a current sensor V2. When the output current exceeds a predetermined value, a control circuit U1 is operated to turn off the switching element S1. In this case, the current caused by the accumulated energy in the choke coil L1 follows through the diode D1 even when the switching element 1 is turned off. However, when an amount of the current is below the predetermined value, and the current is detected by the current sensor V2, the control circuit U1 is operated to turn on the switching element S1. By repeating such operations, the second capacitor PS-A is charged with a constant current in average.

Figure 7:
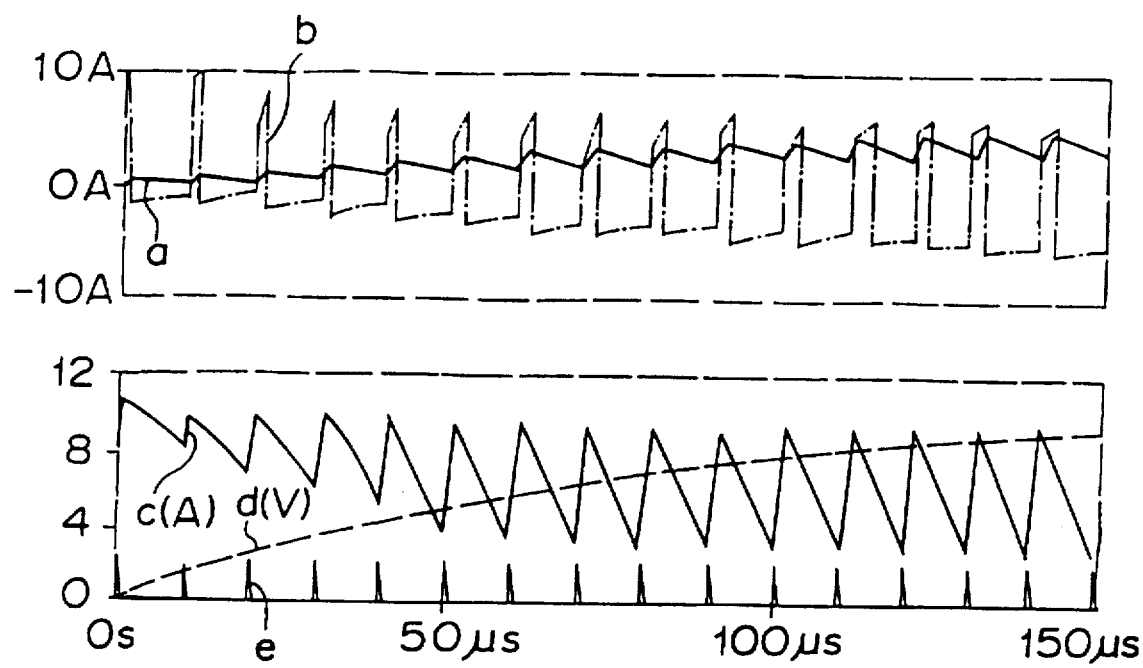
FIG. 7 is a graph showing waveforms at each section in the switching regulator shown in FIG. 6.

FIG. 7 is a graph showing the current waveform appearing at portions in the switching regulator SR shown in FIG. 6, wherein a symbol a represents a current flowing in the current sensor V2, a symbol b represents a current flowing in the capacitor C1, a symbol c represents a current flowing in the choke coil L1, a symbol d represents an output voltage across the terminals of PS-A and a symbol e represents a clock pulses generated in the control circuit U1. The unit of the time axis are microseconds (μs).

Figure 8:
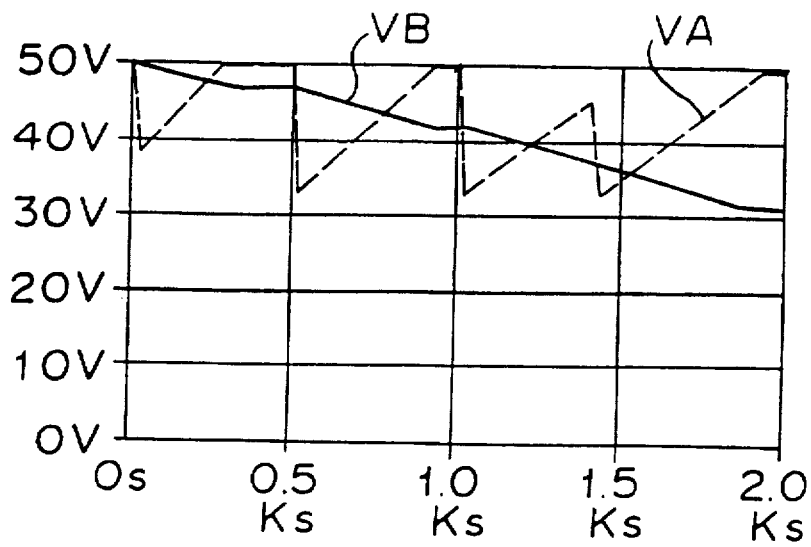
FIG. 8 is a graph showing variation of voltages across the terminals of a first electric double layer capacitor and a second electric double layer capacitor in the power supply in FIG. 5.
Figure 9:
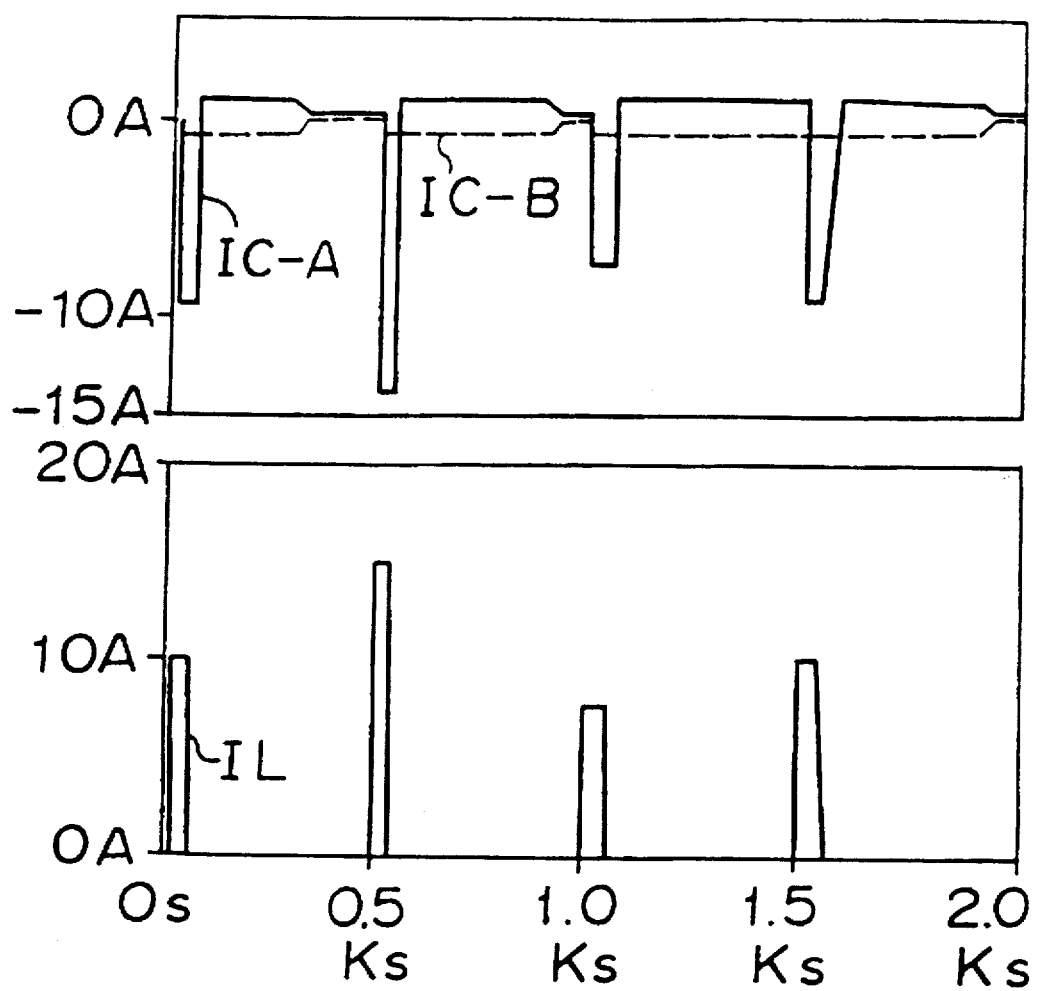
FIG. 9 is a graph showing a load current at an acceleration time in the power supply showing in FIG. 5 and the variation of each current flowing in the first capacitor and the second capacitor, which corresponds to the load current.

FIGS. 8 and 9 are graphs showing a result of the analysis of each portion of the power supply obtained by the before-mentioned simulation program "SPICE". Description will be made with reference to the graphs of FIGS. 8 and 9. The units used for each of the time axes of the graphs are kilo seconds (Ks).

In the graph of FIG. 8, a symbol VB represents a voltage applied to the first capacitor PS-B, and a symbol VA represents a voltage to be supplied from the second capacitor PS-A depending on requirements by the load (not shown).

The lower part of the graph of FIG. 9 shows a load current IL flowing in the load used. In the example shown in FIG. 9, peak loads were applied by supplying a current of 10 A during 11 sec–40 sec after the starting of operation, a current of 15 A during 501 sec–530 sec and a current of 8 A during the 1001 sec–1060 sec.

The upper part of the graph of FIG. 9 shows an output current IC-B from the first capacitor PS-B and an output current IC-A from the second capacitor PS-A. In view of the waveforms of the output currents, it is found that load currents each having a peak are substantially supplied as a current IC-A from the second capacitor PS-A. It is understood that when the voltage at the second capacitor PS-A decreases, the second capacitor PS-A is charged with electric power from the first capacitor PS-B via the switching regulator SR having a constant current output of 2A. In the Figures, the direction of the current flowing into the electric double layer capacitors has a positive value, and the direction of the current flowing out from the capacitor shown has a negative value.

As shown in FIG. 8, the second capacitor PS-A which had been discharged by the peak loads is restored to a fully charged state (a charged state to a rated voltage) during 300 sec–500 sec after the starting. On the contrary, the voltage of the first capacitor PS-B is gradually decreased by the discharge of electric power each time when the second capacitor PS-A is charged from the first capacitor PS-B, the amount of decrease corresponding to an amount used for charging the capacitor PS-A. The power supply can be used without charging until the terminal voltage of the first capacitor PS-B under loading reaches a lower limit below which voltage the switching regulator SR cannot operate.

An output power of regenerative braking can be obtained by using a motor as a generator when the motor is braked, or using a specially designed generator for braking. In this case, the output power of regenerative braking can be effectively utilized by forming a circuit structure as shown in FIG. 10 according to the present invention.

Figure 10:
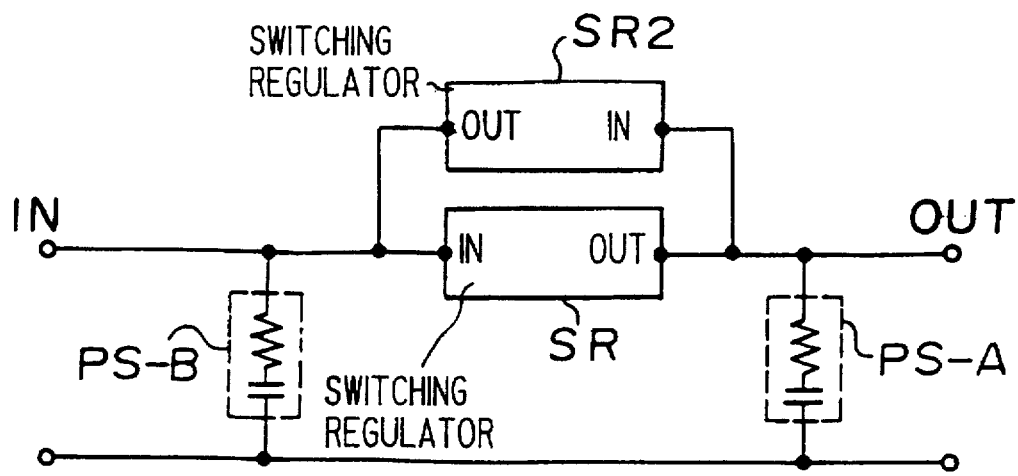
FIG. 10 is a circuit diagram showing another embodiment of the power supply used for the peak load type electric apparatus.

The basic structure of the circuit shown in FIG. 10 is substantially the same as the structure in FIG. 5. In the embodiment shown in FIG. 10 is, however, provided with a second switching regulator SR2 in addition to the first switching regulator SR for charging the second capacitor PS-A with electric power from the first capacitor PS-B. The second switching regulator SR2 is so called an energy returning switching regulator operating in such a manner that when an output power of regenerative braking is stored in the second capacitor PS-A during regenerative braking and the terminal voltage of the capacitor PS-A is excessively increased, an extra amount of electric power is stored back to the first capacitor PS-B.

The energy returning switching regulator SR2 is also of a current output type. Since output power of regenerative braking is generally small as ½–⅒ as electric power for driving, the rated output current of the switching regulator SR2 can be as small as about ½–⅒ of the rated output current of the switching regulator SR.

The power supply shown in FIG. 10 was operated by using the before-mentioned simulation program and analysis was conducted as to how an output power of regenerative braking was absorbed. In this case, as the first capacitor PS-B, a capacitor having a rated voltage of 50 V and a capacity of 100 F (an internal resistance of 0.5 Ω), and as the second capacitor PS-A, a combination of capacitors having a rated voltage of 50 V and a capacity of 25 F (an internal resistance of 0.1 Ω) were used.

Figure 11:
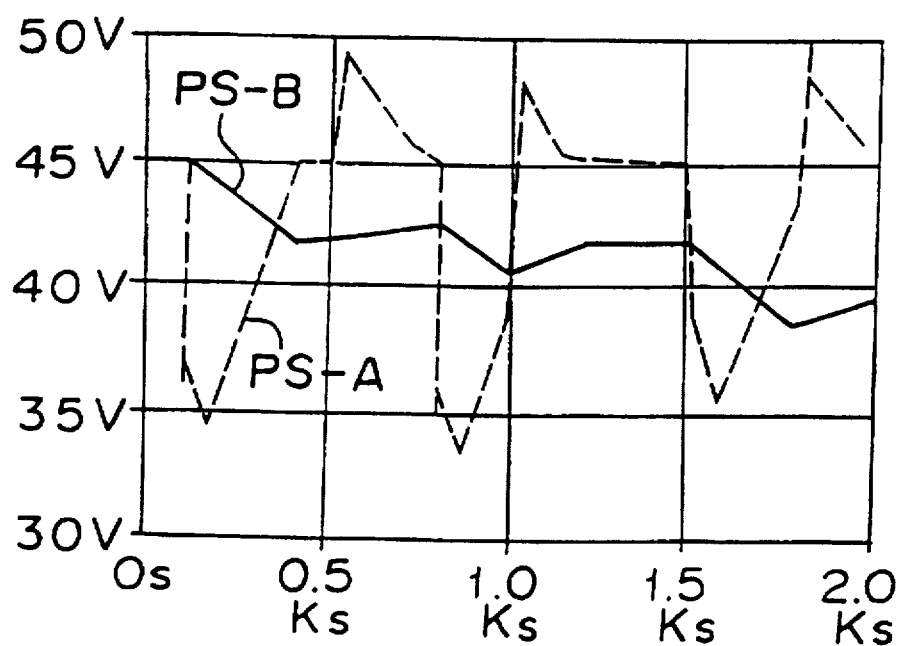
FIG. 11 is a graph showing the variation of voltages across the terminals of the first capacitor and the second capacitor in the power supply shown in FIG. 10.

FIG. 11 is a graph showing a voltage across the terminals of the first capacitor PS-B and a voltage across the terminal of the second capacitor PS-A, the voltages being developed when an output power of regenerative braking is received. In this case, the second switching regulator SR2 for returning electric energy was operated when the terminal voltage of the second capacitor PS-A exceeds 45 V. The output current was 0.5 A.

Figure 12:
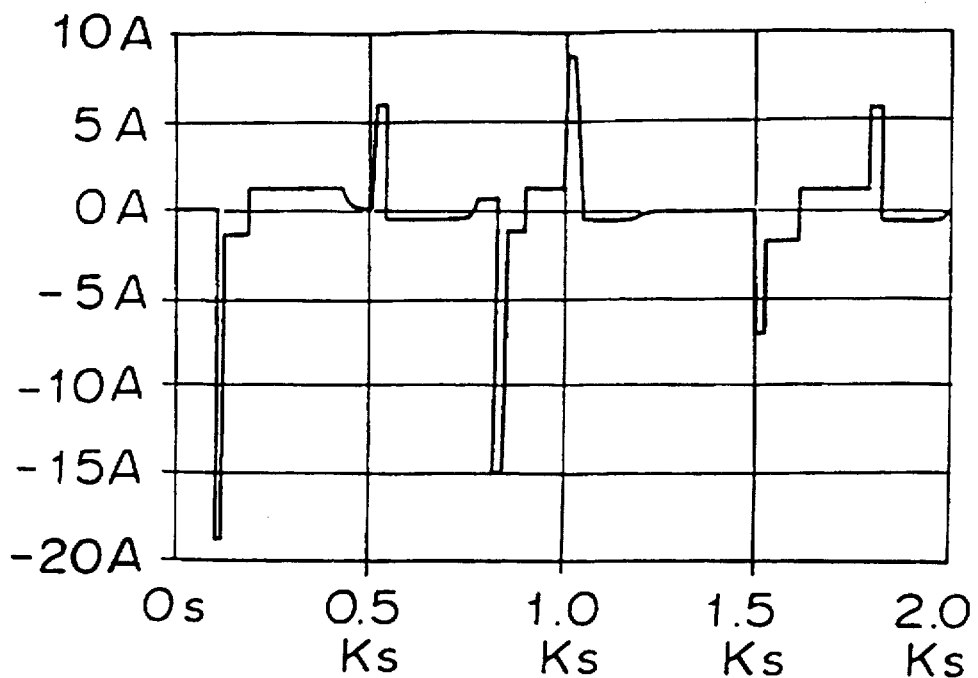
FIG. 12 is a graph showing a current flowing into and from the second capacitor in the power supply shown in FIG. 10.

FIG. 12 is a graph showing the waveform of a current entering into and discharging from the second capacitor PS-A wherein the negative value indicates discharging and the positive value indicates charging. The first peak extending in the negative direction from a level of 0 A represents a load current wherein 20 A is drawn for 10 seconds from the time point of 100 seconds and 2 A is drawn for 70 seconds thereafter. All of those discharge current are subtracted by the charging current of 1 A from the first capacitor PS-B. In the same manner, load currents due to acceleration appear at the time points of 800 seconds and 1500 seconds.

A trapezoidal waveform having a current value of 1 A during 180 seconds–430 seconds, appearing just after the first peak of the load current due to acceleration shows a charging current from the first capacitor PS-B via the switching regulator SR by detecting the discharge of the second capacitor PS-A. The charging current ceases at the time point of 430 seconds when the second capacitor PS-A reaches the fully charged state (a set value of 45 V). After the second and third peaks of the load current, charging currents are supplied from the first capacitor PS-B so as to restore the voltage of the second capacitor PS-A.

In the graph of FIG. 12, a current of 6 A due to the regenerative braking is recovered for 10 seconds from the time point of 500 seconds, and the first capacitor PS-B is charged with the output power of regenerative braking by the function of the switching regulator SR2 for returning electric power (see FIG. 11). After the first peak of regenerative braking current, discharging of 0.5 A takes place during the time of 525 seconds–700 seconds due to the regenerative braking. This is because the set voltage of the second capacitor PS-A is 45 V, and electric power exceeding the pre-set level of the capacitor PS-A is returned to the first capacitor PS-B by the function of the switching regulator SR2. After the first peak of regenerative braking, the second peak of 8 A at the time of 1000 seconds and the third peak of 6 A from regenerative braking at the 1800 seconds are observed. An extra amount of electric power is stored back to the first capacitor PS-B by the function of the switching regulator SR2 for returning electric power.

Combining the first capacitor PS-B of a high energy density type and the second capacitor PS-A of a high power density type, and connecting the switching regulator SR2 for returning electric power in addition to the switching regulator SR for discharging, which is connected between the first and the second capacitors, it is possible to absorb efficiently the output power of regenerative braking under various conditions and for a long time period.

In the embodiment as shown in FIG. 10, a block of the switching regulator SR for charging is connected in parallel to a block of a switching regulator SR2 for returning electric power. However, the both switching regulators SR and SR2 can be assembled on the same circuit board in single package to form a bi-directional switching regulator (a DC/DC converter).

Figure 13:
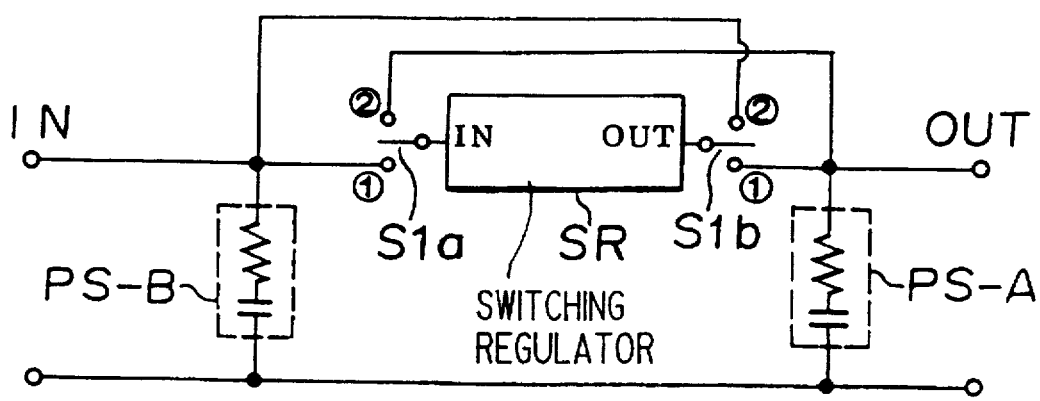
FIG. 13 is a circuit diagram showing another embodiment of the power supply used for the peak load type electric apparatus according to the present invention.

Further, besides the above-mentioned embodiment, it is possible that a single switching regulator performs functions of both charging and returning electric power. FIG. 13 shows a preferred embodiment of this case. In FIG. 13, double through switches S1a, S1b are provided at an input side IN and and an output side OUT of a switching regulator SR. Each of the double through switches S1a, S1b is provided with two contacts ①, ② wherein the contact ① for the double through switch S1a is to be connected to the first capacitor PS-B, and the contact ② of the switch S1a is to be connected to the second capacitor PS-A. On the other hand, the contact ① for the double through switch S1b is to be connected to the second capacitor PS-A and the contact ② of the switch S1b is to be connected to the first capacitor PS-B.

These double through switches S1a, S1b are switched by means of a control means (not shown), and in normal operations, the input side IN and the output side OUT of the switching regulator SR are connected with the contact ①. On the other hand, in a regenerative braking operation, the switches S1a and S1b are connected to the contact ②, whereby the input side IN is connected with the second capacitor PS-A, and the output side OUT is connected with the first capacitor PS-B. With the above-mentioned arrangement, both functions of charging and returning electric power can be performed by a single switching regulator SR. In the embodiment shown in FIG. 13, the double through switches S1a, S1b are respectively formed of mechanical switches. However, they may be formed of electronic switches.

In accordance with the present invention, the following effects are obtainable. In an electric apparatus consuming continuously a relatively constant electric power, a power supply includes an electric double layer capacitor and a switching regulator so that the electric power from the electric double layer capacitor is supplied to the switching regulator to form a constant voltage to thereby supply a relatively constant electric power. Accordingly, it is possible to operate a constant load type electric apparatus with a high electric power utilizing efficiency for a relatively long time.

Further, by using an electric double layer capacitor having a relatively small internal resistance or a combination of plural electric double layer capacitors connected in parallel so as to reduce the equivalent internal resistance, the power supply can be applied to an electric apparatus to be used continuously for a short time.

Further, a charging time for the electric double layer capacitor is extremely short in comparison with a secondary battery. For instance, it becomes practically usable within about 5 minutes and it can be brought into a fully charged state within about 15 minutes although depending on the rated value. A conventional secondary battery would require a charging time of about 6–8 hrs.

In the present invention, by utilizing the electric double layer capacitor, a high electric power utilization efficiency is obtainable. When the switching regulator is designed to be operable to the extent of ¼ of the maximum charging voltage, it is possible to utilize up to 94% of electric power charged in the electric double layer capacitor. On the other hand, a conventional secondary battery has a charging efficiency of about 60%–80%. In a conventional lead battery, the service life is short unless the depth of discharge is kept less than 60% and rapid discharging is avoided. Further, the electric double layer capacitor has a long service life, and a cycle life of 10,000 times is possible, which means substantially no limit in practical use.

In an electric apparatus consuming a relatively large electric power intermittently, a power supply includes a first electric double layer capacitor of a high energy density type, a second electric double layer capacitor of a high power density type and a current output type switching regulator wherein the first capacitor is connected to the second capacitor by interposing the switching regulator so that the second capacitor is charged by the first capacitor via the switching regulator, whereby a long time small power output and a short time large power output can be derived as required.

Further, in addition to the first switching regulator, a current output type second switching regulator is provided to return an extra amount of output power of regenerative braking to the first capacitor from the second capacitor, whereby the excessive amount of output power of regenerative braking is stored in the first capacitor having a large capacity via the second switching regulator during regenerative braking operation. Accordingly, the output power of regenerative braking can be effectively used.

Obviously, numerous modifications and variations of the present invention are possible in light of the above teachings. It is therefore to be understood that within the scope of the appended claims, the invention may be practiced otherwise than as specifically described herein.

What is claimed is:

1. In an electric apparatus consuming continuously a relatively constant electric power, said electric apparatus being characterized by comprising a power supply including an electric double layer capacitor and a switching regulator for transforming variant voltage electric power from the capacitor to a relatively constant voltage electric power.

2. A constant load type electric apparatus as defined in claim 1, wherein the electric apparatus is used continuously for a short time, and said electric double layer capacitor in the power supply having a relatively low internal resistance or being a combination of electric double layer capacitors in which a plurality of electric double layer capacitors are connected in parallel so as to reduce an equivalent internal resistance.

3. In an electric apparatus consuming intermittently a relatively large electric power, said electric apparatus being characterized by comprising a power supply including a first electric double layer capacitor of a high energy density type, a second electric double layer capacitor of a high power density type and a current output type switching regulator wherein the first capacitor is connected to the second capacitor by interposing the switching regulator so that the second capacitor is charged by the first capacitor via the switching regulator, whereby a long time small power output and a short time large power output can be derived as required.

4. In an electric apparatus consuming intermittently a relatively large electric power during operation and being capable of efficient regenerative braking at the time of braking, said electric apparatus being characterized by comprising a power supply including a first electric double layer capacitor of a high energy density type, a second electric double layer capacitor of a high power density type, a first switching regulator of a current output type between the first and the second capacitors which usually charges the second capacitor with electric power from the first capacitor and a second switching regulator of a current output type which returns an extra output power of regenerative braking of the electric apparatus via the second capacitor to the first capacitor, whereby a long time small power output and a short time large power output can be derived as required, and the extra output power of the regenerative braking supplied to the second capacitor is stored in the first capacitor of a large capacity via the second switching regulator.

5. The electric apparatus according to claim 4, wherein a bi-directional switching regulator is used for the first and the second switching regulators.

6. The electric apparatus according to claim 4, wherein a switching regulator is used for the first and the second switching regulators, whereby in a normal operation, an input terminal of the switching regulator is connected to the first capacitor and an output terminal of the switching regulator is connected to the second capacitor, and during regenerative braking, the input terminal of the switching regulator is connected to the second capacitor and the output terminal is connected to the first capacitor by changing the connections.

\* \* \* \* \*